K. P. McELROY.
PROCESS OF MAKING CHLORHYDRINS.
APPLICATION FILED FEB. 8, 1917.
1,295,339.
Patented Feb. 25, 1919.
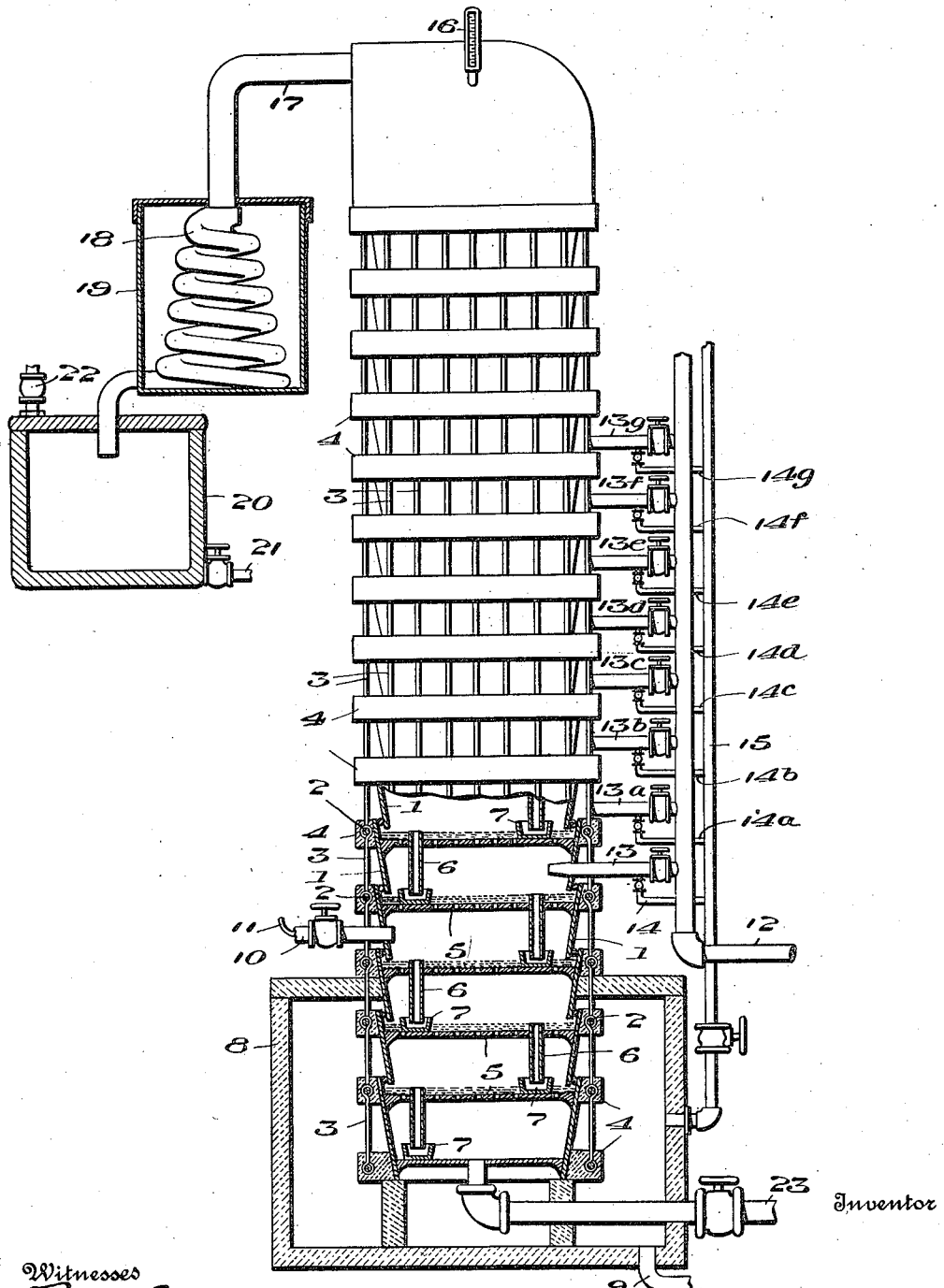

UNITED STATES PATENT OFFICE.

KARL P. McELROY, OF WASHINGTON, DISTRICT OF COLUMBIA, ASSIGNOR TO CHEMICAL DEVELOPMENT COMPANY, A CORPORATION OF MAINE.

PROCESS OF MAKING CHLORHYDRINS.

1,295,339. Specification of Letters Patent. Patented Feb. 25, 1919.

Application filed February 8, 1917. Serial No. 147,465.

*To all whom it may concern:*

Be it known that I, KARL P. MCELROY, a citizen of the United States, residing at Washington, in the District of Columbia, have invented certain new and useful Improvements in Processes of Making Chlorhydrins, of which the following is a specification.

This invention relates to processes of making chlorhydrins; and it comprises a method of producing chlorhydrins of the olefins wherein a gaseous or vaporous olefin, or a gaseous mixture comprising such an olefin, is subjected to the action of chlorin and water vapor in a vertical, towerlike reaction chamber of the general nature of the structures commonly used as column stills or fractionating devices, said olefin or the mixture comprising it being introduced at or near the base of the tower, chlorin being introduced at one or more points (best at a plurality of points) thereabove and vapors being withdrawn from the top of the tower and sent through a suitable condenser to regain the chlorhydrins produced; all as more fully hereinafter set forth and as claimed.

The gaseous olefins, (ethylene, propylene and the butylenes) are well known substances of the general formula $C_nH_{2n}$. In the pure state they are only made by relatively difficult chemical processes from relatively expensive materials. Ethylene may be produced by catalytically hydrogenating acetylene or by breaking up alcohol with hot sulfuric or phosphoric acid. Mixtures of these gaseous olefins can however be readily and cheaply prepared by exposing various organic materials, such as petroleum oils, to heat; and it is such mixtures that I particularly contemplate using in the present invention.

The chlorhydrins of the gaseous olefins are thin mobile liquids of pleasant odor, more or less soluble in water but separating from their water solution on addition of various soluble salts. When dry and pure they have a boiling point higher than that of water but in the presence of water their boiling point is below 100° C.; a fact which is utilized in the present invention. Chemically considered, they are chlorinated alcohols; ethylene chlorhydrin, for example, being $CH_2Cl.CH_2OH$, while ethyl alcohol is $CH_3.CH_2OH$. Being alcoholic in their nature and also chlorin compounds, they are excellent solvents for varnish making and many other purposes; being, for example, good solvents for the copals. They are also an excellent material for the preparation of very many other bodies of technical utility, being highly reactive in their nature. They may for instance be converted into glycols by replacing the chlorin by hydroxyl (.OH); ethylene chlorhydrin giving ethylene glycol, $CH_2OH.CH_2OH$. The glycols are much like glycerin and may replace it for many purposes, as in making explosives by nitration. Being hygroscopic and permanent in the air, they may be used in tobacco, snuff, stamp pads, etc. By converting the chlorhydrins into the corresponding acetates, formates, butyrates, benzoates, etc., by ordinary ester-making methods, a wide variety of solvent materials may be prepared. By reduction the chlorhydrins give the corresponding alcohols.

The chlorhydrins of the gaseous olefins all have about the same boiling points, the range being between 125 and 135° C.; and the mixture of chlorhydrins made by treating the mixture of gaseous olefins of oil gas by the present method is, for commercial purposes, a unitary material. It may of course be separated into the individual chlorhydrins by appropriate methods; but generally this is not worth while.

Chlorhydrins are produced when the gaseous olefins and chlorin meet in the presence of an ample amount of water or water vapor (steam). The exact nature of the actions taking place is a matter of theory; but the final result may be indicated by the general equations:—

$$C_nH_{2n} + H_2O + Cl_2 = C_nH_{2n}OHCl + HCl$$

It will be noted that half the chlorin reappears as HCl (hydrochloric acid) and half as chlorhydrin. Whether successive reactions take place to give the final result, or whether three different molecules simultaneously react together is a matter of theoretical speculation. I content myself with noting the facts. With a diminution in the amount of water or water vapor present in the sphere of reaction, there is a tendency for another and competitive reaction to take place: the formation of what are known as olefin chlorids. Ethylene for example, reacts with chlorin to give ethylene chlorid ($C_2H_4Cl_2$); a substance well known as "Dutch liquid." Propylene and the butylenes act similarly to give similar products, which will be hereinafter referred to under the same name. The olefin chlorids are heavy liquids insoluble in water, and though not now made commercially, are of value as solvents. It is an object of the present invention to provide conditions favoring the production of chlorhydrins at the expense of the Dutch liquid.

As a general rule, it may be said that the greater the amount of water (or water vapor) present in the sphere of reaction relative to the amounts of chlorin and of olefin the less is the tendency to the production of olefin chlorids (Dutch liquid) and the greater the tendency to produce chlorhydrins, and vice versa. Curiously enough, however, the presence of some water or moisture (although a vanishingly small amount suffices) is also practically necessary in converting the olefins into Dutch liquid, perfectly dry olefins not reacting with dry chlorin to give either of the products here in consideration. It may well be that the production of chlorhydrins is primary and the production of chlorids secondary; the HCl formed in the chlorhydrin reaction reacting on the chlorhydrin to form the chlorid. But this is a matter of theory. It is however certain that the more HCl is present in the sphere of reaction the greater is the tendency to the production of Dutch liquid. It is therefore necessary in practice to keep the concentration of HCl low in the reaction zone. This may be accomplished by simply washing the HCl out of the reacting gases and vapors with water. An excess of olefins should always be present to prevent substitutive reactions by the chlorin.

In another and copending application Serial No. 34,678, filed June 17, 1915, I have described and claimed a method of making chlorhydrins utilizing the described facts wherein olefins and chlorin are blown into a steam-filled chamber containing a body of water to absorb the HCl produced; such chamber being maintained at about 100° C. Oil gas is described as a suitable source of olefins. Vapors of chlorhydrins, the excess of waste gases and the water vapor are led from the reaction chamber to a condenser through a reflux arrangement which condenses and returns the excess of water to the hot chamber.

In the present embodiment of my invention I perform the reaction in a vertical reaction chamber of tower-like construction, passing in the various gases at or near the bottom and removing produced vapors at the top. The gases and vapors pass upward against a downflowing current of hot water which furnishes the water vapor necessary for dilution and reaction and also serves as a scrubbing means to remove HCl. At the bottom, a solution of HCl is removed. The reaction chamber may be any of the ordinary types of tower used in the chemical industries for absorption of gases and promotion of gas reactions and is best provided with a filling or packing adapted to promote intimate contact between liquids and gases, such as those used in the various types of Gay-Lussac and Glover towers, or reaction towers in the sulfuric acid industry. It may be filled with broken brick or stone; but I find it better to use perforated cross-shelves of well known types as giving a more positive contact and a better mixing operation. The types of shelves used in column stills, dephlegmators and similar fractionating devices are well adapted. The tower may be built of stoneware or stone, or any other material resistant to chlorin and HCl. Metal, if used, must be well coated with a resistant varnish such as the phenol-formaldehyde condensation products. I find a construction well adapted for the present purposes is afforded by building a square or hexagonal tower of slate, such as is used for roofing, bound by iron tie rods or inclosed in reinforced concrete. Joints may be packed with asbestos mixed with one of the stated condensation products. Or a packing material of asbestos mixed with water glass may be applied, allowed to dry in place and then treated with saturated solution of salt.

The top of the tower is connected to a suitable condenser and means for heating are supplied at or near the bottom. In use it is, like a column still, kept somewhat hotter at the bottom than at the top, for reasons later appearing. All the heat may be supplied by blowing in steam or by an external heating jacket; but in practice I find it better to use both heating means.

In the accompanying illustration I have shown, more or less diagrammatically, one type of apparatus adapted for use in the described process. This showing is in vertical section, certain parts being shown in elevation, of a complete rectifier apparatus. In the showing the column is made of slate slabs or sheets 1 nested together and held in position by encircling tie rods 2 and vertical rods 3. A layer of concrete 4 may inclose these reinforcing metal rods. The joints between the slate strips or slabs are packed as described. In the interior of the column it is provided with a number of perforated plates or shelves 5 spanning the column. Each such shelf is provided with drain pipe 6, which may be of glass, going down into cup 7 on the subjacent shelf; the whole being a well known construction in the distilling art. The bottom of the column is shown as inclosed in a concrete housing 8 provided with drip 9; this housing forming a steam chamber. At a point above the bottom is gas inlet 10 through which oil gas or other material composed of or comprising gaseous or vaporous olefins is introduced. Introduction may be by steam injector 11. Chlorin main 12 is provided with a number of outlets 13—13ª—13ᵇ, etc., leading into the column between the shelves, as many of these inlets being used as may be desired. Each inlet is valved so as to permit independence in working. In each chlorin inlet is a steam injector (respectively 14—14ª) in valved communication with steam main 15. A branch of this steam main leads into the heating casing at the bottom of the column. At its top the column is provided with thermometer 16 and vapor outlet 17 leading to condensing worm 18, which may be of stoneware or the like, in tub 19. Condensed liquid and gases from this condenser are led into receiving tank 20 provided with liquid outlet 21 and gas outlet 22. At the base of the column is an outlet 23 for hydrochloric acid.

The use of this structure is obvious from the foregoing. The oil gas or other olefin-rich material led in through 10 is thoroughly admixed with steam and the mixture passes through the hot liquid on the shelf giving a thoroughly mixed body of water vapor and gas. With level plates and uniform liquid height passage of gas will be substantially uniform through the holes giving a uniform bubbling effect. With small perforations liquid does not pass downward through the holes. The gas-steam mixture meets a certain portion of chlorin and steam coming in from 13. The new mixture thus made is made intimate and perfect in going through the holes and liquid of the next plate above; and is also well scrubbed. The mixture now passes through the liquid on the shelf above in the same way and so on up through the column. Chlorin may be added at as many points as may be desired. Steam is led into the housing 8 and serves to maintain the bottom of the column at a relatively high temperature. The downflowing liquid passes from plate to plate until it reaches the three lowermost shelves. As will be noted these shelves are below the point where gas is introduced. Their function is to concentrate hydrochloric acid more or less and deliver a relatively rich acid at 23 while still furnishing a comparatively sweet steam for admixture with the gases coming in through 10. The apparatus is so run that the thermometer 16 indicates a temperature between 95 and 100°; the particular temperature used varying somewhat with the results desired as hereinafter set forth. The chlorhydrins of oil gas are all volatile with steam at a temperature of 95 to 97 and pass forward while the excess of steam itself is condensed and runs downward. There is a steady current of liquid passing from shelf to shelf from the top of the apparatus to the bottom, scrubbing the mixture of gases and vapors as it goes and serving to keep the zone of reaction between each pair of shelves substantially free of HCl. The HCl is removed substantially as rapidly as it forms. In making chlorhydrins I find it desirable to have introduction of chlorin at a number of points as described and claimed in my acknowledged copending application No. 34,678.

The apparatus may be used for making Dutch liquid in lieu of chlorhydrins, but when so used it is desirable to introduce more of the chlorin at the lower points to have mixtures rich in chlorin and to keep the top of the apparatus warm so as to diminish the amount of downflowing water. The greater the amount of water and water vapor the less is the tendency to the formation of Dutch liquid and vice versa. The apparatus should be run nearly dry to give a good yield of Dutch liquid. When so run it is well adapted for this purpose. Of the olefins in oil gas the propylene and the butylene readily unite with chlorin to give the corresponding chlorids but ethylene is so little reactive that it does not combine in many ordinary ways of bringing chlorin and oil gas together. In the described apparatus this union, however, may be effected.

If the apparatus is so run as to make chlorhydrins the liquid condensing in 20 will be a watery solution. It is advisable, in this modification of my invention, to run over enough water vapor to give this solution. With less water vapor the chlorhydrins will separate as such, that is as an oily layer but since their vapor tension is quite large the issuing gases may have to be scrubbed with water. For this reason I here prefer to have enough condensing water to wash out all the chlorhydrins. The amount of water may be regulated by control of the temperature at the top of the column. As this temperature will be the resultant of radiation from the sides of the column and the heat applied at the base as well as that introduced with the steam, more water may be sent over by jacketing or otherwise heat insulating the top of the column or by running more steam into the housing at the bottom. If the apparatus is being run to make Dutch liquid, the temperature at the top of the column will usually be rather low since Dutch liquid and water make a very low boiling mixture. Where Dutch liquid and chlorhydrins are both being produced the temperature at the top of the column may be considerably below 95° with advantage as chlorhydrins, Dutch liquid and water make a triple mixture of low boiling point.

The watery solution of chlorhydrin obtained in 20 may be distilled in any suitable apparatus to recover the chlorhydrins; the apparatus just described will serve for this purpose, being now used as a rectifying column. In so using it, the watery solution may be introduced through inlet 10 and the apparatus run as just described save that, of course, neither gas nor chlorin is introduced. On rectification the watery solution gives a first fraction which separates into two layers, a lower layer of chlorhydrins containing water and an upper layer of a water solution of chlorhydrins. The latter layer may be returned for rerectification; and the whole operation may be conducted in a methodical well understood way to produce the oily chlorhydrins. The oily chlorhydrins may be dried with salt and redistilled to give, in the case of material made from oil gas, a liquid boiling between 125° and 135° C. The salt solution formed may be blown out with steam to regain dissolved chlorhydrins. Where Dutch liquid is formed it is simply removed from the watery solution and washed to recover dissolved chlorhydrins, if any. The chlorhydrins recovered may be converted into glycols by boiling under pressure with calcium carbonate, sodium bicarbonate or other materials. They may be converted into acetates by suitable treatment with calcium acetate. The chlorhydrins may also be converted into a wide variety of other esters in several ways. On treatment of the chlorhydrins with caustic soda they are broken up into the so-called olefin oxid, highly volatile bodies which may be fractionated to give pure products. These oxids, ethylene oxid for example, on treatment with hydrochloric acid, give pure chlorhydrins. On treating with chilled nitric acid they give nitrates. They may be converted into pure glycols by hydrolysis with weak sulfuric acid.

The olefins introduced at 10 may be made in any well known way. As stated ante I regard oil gas as a particularly suitable material for my purposes. Such oil gas may be made by running gas oil, kerosene, petroleum residuum, etc., into a heated tube with a portion of it maintained around a red heat. The oils in passing the superheated portion of the tube are gasified, yielding a gas rich in olefins. With proper manipulation, this gas may run 50 per cent. of olefins (total bromin absorption). I find it best to run the apparatus so that more oil goes through the gasifying zone than is gasified. On now quickly cooling the gas the vapors of the excess oil condense as a fog and effectually scrub the gas of gasolene and the like. Gas of greater richness than 50 per cent. may be made but in this event there is danger of scorching with production of aromatic derivatives; and bodies like benzol are undesirable in the present embodiment of my invention. The excess of oil may be returned to the gasifying zone together with fresh oil. The gas may be scrubbed to free it of sulfur, etc., in any of the well known ways.

Oil gas made in other ways may be employed; but the described method gives a satisfactory material for the present purposes. Gasification under reduced pressure and gasification in the presence of waste gases coming from the chlorhydrin manufacture are expedients which may be used with advantage, singly or together. Other gases rich in olefins such as gas made by coking coal at low temperatures, may be employed, as may the pure gaseous olefins themselves. Instead of using the olefins normally gaseous at atmospheric temperatures, vapors of liquid olefins may be used; as by blowing in vapors of ordinary cracked gasolene. Cracked gasolenes are rich in volatile liquid olefins; and these olefins submitted to the present treatment give chlorhydrins analogous to those obtained from the gaseous olefins.

Whatever the gases or vapors used, it is best to introduce a little more than is equivalent to the chlorin employed, as this conduces to regularity of action and prevents undesired side reactions, such as "substitution." With an oil gas showing a 50 per cent. bromin absorption, the apparatus may be so run as to give waste gases of, say, 3 to 5 per cent., representing, say, 97 to 94 per cent. utilization. For the same reason it is desirable to add the chlorin portionwise as shown.

The waste gas escaping beyond the condenser in using oil gas is of high calorific value. While it may be reheated to 700° C. or thereabout to give a further portion of olefins, it is ordinarily more economical to use it for heating or power purposes.

The hydrochloric acid solution draining off from the bottom of the apparatus may be used to produce chlorin with manganese binoxid, by the Deacon process, etc.; or it may be used in lieu of make-up water in dissolving salt for replenishing electrolytic cells producing chlorin.

I find that perforated shelves, such as those shown, or the like devices used in dephlegmators, are better in the present operation than irregular fillings such as those given by broken stone. This is for the reason that their mixing action is much more positive. Steam, oil gas, chlorin and the chlorhydrins are materials of very different specific gravity and there is the usual difficulty in securing accurate and uniform mixture. Stratification with such a mixture is difficult to avoid. But with the perforated shelves and like devices there is a positive mixing action in going from one section of the apparatus to the next, whereas with an ordinary filling of any type, such as broken stone, there are apt to be channeling phenomena; there is not a positive admixture. With the shelves shown, all the gases in passing from the space between one pair of plates to the next space above must go through the holes in the plate and in practice it is found that the gases go very uniformly through each of the holes. This much contributes to actual and positive mixing.

In using the structure of the present device for making Dutch liquid from oil gas, that is the mixed dichlorids of the mixed gaseous olefins, it is better to have a descending flow of water since although this usually leads to the formation of more or less chlorhydrin yet in its absence union is not ready nor complete and side reactions may take place. It is still better to use instead of water a solution of hydrochloric acid which may be formed in the apparatus (from some preliminary chlorhydrin formation) or may come from another source. If the liquid flowing down through the tower be kept fairly rich in HCl, the formation of chlorhydrin may be precluded and the tower will then deliver the olefin chlorids with a high utilization both of chlorin and of gas. The ethylene, as well as the propylene and the butylenes, is chlorinated. As previously noted, it is difficult to chlorinate the ethylene of oil gas to form ethylene chlorid.

What I claim is:—

1. The process of making chlorinated bodies from gaseous olefins which comprises passing such olefins in admixture with chlorin upward through a heated vertical tower against a descending current of aqueous liquid at or near the boiling point.

2. The process of making chlorinated bodies from gaseous olefins which comprises passing such olefins in admixture with chlorin upward through a heated vertical tower against a descending current of aqueous liquid at or near the boiling point and through a succession of perforated plates spanning such tower.

3. The process of making chlorhydrins from gaseous olefins which comprises passing such olefins in admixture with chlorin upward through a heated vertical tower against a descending current of water at or near the boiling point, the flow of water being sufficiently copious to maintain the gases substantially free of HCl.

4. The process of making chlorhydrins from gaseous olefins which comprises passing such olefins in admixture with chlorin upward through a heated vertical tower spanned by a succesison of perforated plates against a descending current of water at or near the boiling point covering such plates and flowing downward from plate to plate.

5. The process of making chlorinated bodies from oil gas which comprises passing such oil gas in admixture with chlorin upward through a heated vertical tower against a descending current of aqueous liquid at or near the boiling point.

6. The process of making chlorinated bodies from oil gas which comprises passing such oil gas in admixture with chlorin upward through a heated vertical tower against a descending current of aqueous liquid at or near the boiling point and through a succession of perforated plates spanning such tower.

7. The process of making chlorhydrins from oil gas which comprises passing such oil gas in admixture with chlorin upward through a heated vertical tower against a descending current of water at or near the boiling point, the flow of water being sufficiently copious to maintain the gases substantially free of HCl.

8. The process of making chlorhydrins from oil gas which comprises passing such oil gas in admixture with chlorin upward through a heated vertical tower spanned by a succession of perforated plates against a descending current of water at or near the boiling point covering such plates and flowing downward from plate to plate.

9. The process of making chlorhydrins which comprises passing a mixture of oil gas and chlorin upward through an apparatus of the general type of a rectifier against a current of hot water flowing downwardly therethrough, removing and condensing produced chlorhydrins from the top of the structure and removing water containing HCl from the bottom of the structure.

10. The process of making chlorhydrins which comprises passing a mixture of oil gas and chlorin upward through an aparatus of the general type of a rectifier against a current of hot water flowing downwardly therethrough, removing and condensing produced chlorhydrins from the top of the structure, removing water containing HCl from the bottom of the structure and refractionating such water to obtain a more concentrated acid, the water vapor separated in such fractionation being returned to the apparatus.

11. The process of making chlorinated bodies from oil gas which comprises passing oil gas and chlorin upward through a heated column and through a series of spaced layers of hot aqueous liquid and condensing the vapors formed.

12. The process of making chlorhydrins from oil gas which comprises passing oil gas and chlorin upward through a heated column and through a series of spaced layers of aqueous liquid, said liquid flowing from layer to layer at a sufficient rate to maintain low concentration of HCl therein and removing and condensing vapors from the top of the column.

13. The process of making chlorhydrins from oil gas which comprises passing a current of oil gas and steam upward through a hot vertical column against and in intimate contact with downward flowing liquid while introducing chlorin into such stream, and removing and condensing vapors from the top of the column.

14. The process of making chlorhydrins from oil gas which comprises passing a current of oil gas and steam upward through a hot vertical column against and in intimate contact with downward flowing liquid while introducing chlorin into such stream at a plurality of points, and removing and condensing vapors from the top of the column.

In testimony whereof I affix my signature.

K. P. McELROY.